United States Patent
Hubbard et al.

[19]

[11] Patent Number: 6,033,782
[45] Date of Patent: Mar. 7, 2000

[54] LOW VOLUME LIGHTWEIGHT MAGNETODIELECTRIC MATERIALS

[75] Inventors: Ronald N. Hubbard, Encinitas; Michael L. Duhl, San Diego, both of Calif.

[73] Assignee: General Atomics, San Diego, Calif.

[21] Appl. No.: 08/861,240

[22] Filed: May 21, 1997

Related U.S. Application Data

[63] Continuation-in-part of application No. 08/106,488, Aug. 13, 1993, abandoned, and a continuation-in-part of application No. 08/349,957, Dec. 6, 1994, Pat. No. 5,814,367.

[51] Int. Cl.[7] .................................................. B32B 5/16
[52] U.S. Cl. ..................... 428/407; 428/900; 428/327; 252/62.54
[58] Field of Search ...................... 252/62.54; 428/407, 428/900, 327; 427/128, 130

[56] References Cited

U.S. PATENT DOCUMENTS

| | | | |
|---|---|---|---|
| 3,540,047 | 11/1970 | Walser et al. | 343/18 |
| 4,168,986 | 9/1979 | Venis, Jr. | 106/291 |
| 4,204,942 | 5/1980 | Chahroudi | 204/298 |
| 4,322,276 | 3/1982 | Meckel et al. | 204/192 P |
| 4,337,990 | 7/1982 | Fan et al. | 350/312 |
| 4,407,685 | 10/1983 | Hankland | 156/212 |
| 4,414,254 | 11/1983 | Iwata et al. | 428/34 |
| 4,842,893 | 6/1989 | Yializis et al. | 427/44 |
| 4,851,095 | 7/1989 | Scobey et al. | 204/192.12 |
| 4,923,585 | 5/1990 | Krauss et al. | 204/298.04 |
| 5,051,200 | 9/1991 | Srail | 252/62.54 |
| 5,059,245 | 10/1991 | Phillips et al. | 106/22 |
| 5,366,664 | 11/1994 | Varadan et al. | 252/512 |
| 5,383,995 | 1/1995 | Phillips et al. | 156/230 |
| 5,409,624 | 4/1995 | Watanabe | 252/62.54 |
| 5,464,710 | 11/1995 | Yang | 430/1 |
| 5,513,040 | 4/1996 | Yang | 359/585 |
| 5,571,624 | 11/1996 | Phillips et al. | 428/403 |
| 5,629,092 | 5/1997 | Gay | 428/407 |

FOREIGN PATENT DOCUMENTS 8910430  11/1989  WIPO.

*Primary Examiner*—Timothy M. Speer
*Attorney, Agent, or Firm*—Juettner Pyle & Piontek

[57] ABSTRACT

A magnetodielectric composition is made of flakes of magnetic material dispersed in a binder at a concentration of about 30 to 60%. The flakes consist of a thin film of magnetic material or alternating thin film layers of magnetic material and insulating material. The flakes do not include a substrate. Consequently, the effective volume concentration of magnetic material in the composition is far greater than with other magnetodielectric materials. The binder is selected to provide a fluent composition for application like paint or a setable composition for formation of sheets and molded structural elements. In use, the composition is effective to reduce the size, weight and volume of electrical devices such as antennas, delay lines, phase shifters and other devices requiring interaction with and/or magnetic response to high frequency radiation.

12 Claims, 1 Drawing Sheet

FIG. 1
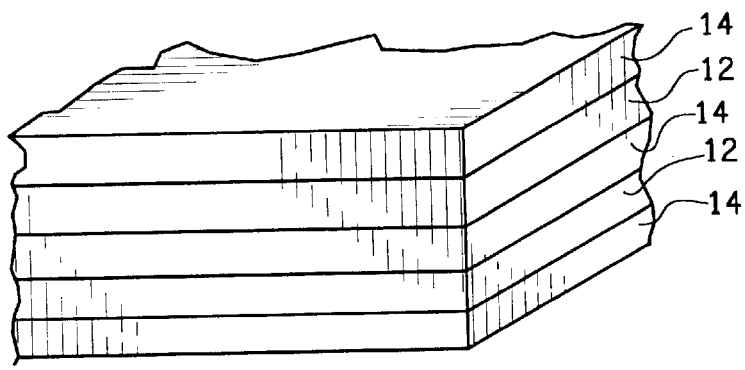
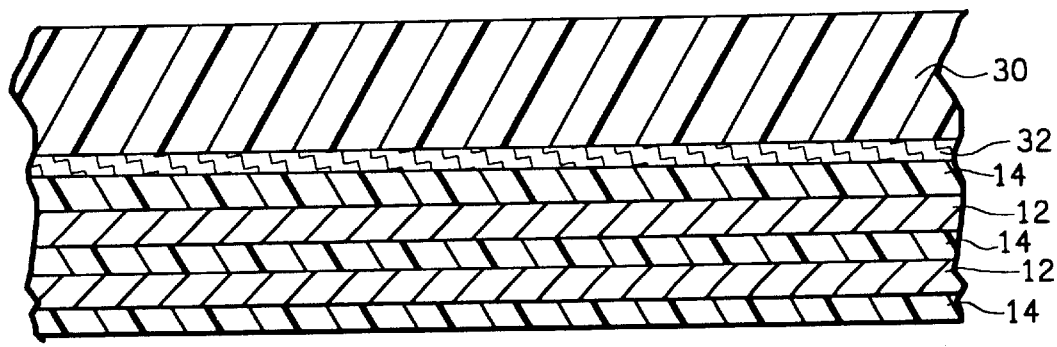
FIG. 2

LOW VOLUME LIGHTWEIGHT MAGNETODIELECTRIC MATERIALS

CROSS REFERENCE

This application is a continuation-in-part of applications Ser. No. 08/106,488, filed Aug. 13, 1993, now abandoned, and Ser. No. 08/349,957, filed Dec. 6, 1994, now U.S. Pat. No. 5,814,367, issued Sep. 29, 1998.

FIELD OF THE INVENTION

The present invention relates to magnetodielectric materials, particularly improved magnetodielectric materials that are lightweight, have very low volume and are easy and convenient to make and use, and that are effective to reduce the size, weight and volume of electrical devices such as antennas, delay lines, phase shifters and other devices requiring interaction with and/or magnetic response to high frequency radiation.

BACKGROUND

U.S. Pat. No. 3,540,047 to Walser et al discloses thin film magnetodielectric materials that have proven quite effective in electrical devices of the type referred to above.

According to the patent, the materials comprise a substrate and a plurality of discrete thin film elements arranged in orderly array on the substrate. Each element is comprised of a thin film layer of magnetic material or a plurality of thin film layers of magnetic material separated by intervening, alternating, thin film dielectric insulating layers. In the preferred embodiment illustrated, the elements are rectangular in shape and arranged on the substrate in a uniform pattern of rows and columns.

The uniform, grid like array of the elements is obtained by covering the substrate with a deposition mask during deposition of the metal and dielectric layers, or by post deposition photo-resist acid etching; primarily costly and complex pattern etching.

The magnetic material is preferably a nickel-iron or nickel-iron-cobalt alloy commercially available under the tradename "Permalloy"; the insulating layers are preferably silicon oxide, but could also be magnesium fluoride or zinc sulfide; and the substrate may be glass, foil or polymer film. The materials are described as having significant advantages over materials having a continuous thin film of metal. However, the materials of Walser et al are available only in sheet form and have a very low effective volume fraction of magnetic material, i.e., the ratio of the volume of magnetic material to the total volume of the substrate, the dielectric insulating layers and the magnetic metallic layers.

SUMMARY OF THE INVENTION

The object of the invention is to provide significant improvements in magnetodielectric materials of the type described in the Walser et al patent.

In particular, the invention has as its primary objects to (1) decrease the volume, (2) decrease the weight, (3) increase the effective volume fraction of magnetic material, and (4) increase the flexibility, convenience and efficiency of application and use of magnetodielectric materials.

Supplemental and complementary objectives are to provide magnetodielectric materials having high electrical thickness, low reflectance and low attenuation loss.

Further objects are to reduce the costs of manufacture and the costs of application of the materials and to broaden the uses to which such materials may be applied.

In accordance with the present invention, magnetodielectric materials are comprised simply of discrete single layer or multilayer magnetic flakes dispersed in a polymeric binder without the presence of any substrate material. The binder may be liquid or fluent so that the material may be sprayed or brushed onto a device like paint, or can be cast or molded into sheets, blocks or structural magnetic components or devices.

For any given application, the material of the invention is thinner, lighter and lower in cost than prior art materials, and can be applied in or conformed to any arbitrary shape rather than being limited to application in sheet form.

The effective volume fraction of the magnetic component in the material of the invention is significantly greater, and thus the volume of the material required for a given result is significantly less, than with the prior art materials. As an example, in a prior art sheet having 40 pairs of metal/dielectric layers, each 0.1 microns thick, deposited on a 75 micron thick polymer substrate, the effective volume fraction of the magnetic component is less than 5%. [(40×0.1)/75+(80×0.1))=4/83=0.0482]. In contrast, a material provided in accordance with the invention comprised of flakes having equal numbers of metal and dielectric layers of equal thicknesses and dispersed in a binder at a concentration of 50% by volume will have an effective volume fraction of magnetic material of 25% [50% flakes having 50% metal= 0.5×0.5=0.25] which is five times greater than that of the prior art materials. Thus, for a given magnetic capacity in the example given, the present invention requires only 20% as much material as the prior art, thereby providing an 80% decrease in the volume of material required and a corresponding decrease in weight and cost.

Also, the fact that the material of the invention can be sprayed like paint or cast in a mold, as contrasted to being glued on in sheets, greatly reducing installation costs and broadens the number of applications and devices where the material can be used.

Further in accord with the invention, the magnetodielectric flakes can be dispersed randomly in the binding matrix and need not be in the orderly array specified by Walser et al, thereby eliminating the requirement for an orientation support or substrate.

The thin single or multilayer flakes of the invention can conveniently be formed by depositing a layer of magnetic material, or alternating layers of magnetic material and dielectric material, onto a substrate which has preferably been coated with a soluble release agent, with the number of layers ranging from 1 to 100 or more. After deposition, if a release layer is present, the coated substrate is immersed in a solvent that dissolves the release layer, freeing the thin film material from the substrate and causing it to break up into flakes. The thin film flakes are then filtered out of the solvent solution and dried. If a release layer is not used, alternate methods of removing the thin film from the substrate include pulling the substrate over a sharp edge located adjacent a vacuum collection system for collecting the resulting flakes. The flakes are mechanically sized by the use of sieves or by shearing the flakes in a high speed mixer. The flakes are then mixed in a binder, preferably polyurethane, at a concentration of about 30% to about 60% by volume to form a sprayable or moldable composition. The material is therefore produced economically.

Additional cost improvements are achieved by the use of dielectric materials other than oxides, by using dielectric layers than can be deposited at the same time and speed as the magnetic layers, and by using new, multicompound materials for the magnetic layers.

These and other objects, advantages and features of the invention will become apparent from the following detailed description, as considered in conjunction with the accompanying drawings.

BRIEF DESCRIPTION OF THE DRAWINGS

FIG. 1 is a fragmentary schematic illustration, in perspective and on a greatly magnified scale, of a flake of magnetodielectric material made in accordance with the invention; and FIG. 2 is a schematic illustration, in cross section and on a greatly magnified scale, of a method for making the flakes of the invention.

DETAILED DESCRIPTION OF PREFERRED EMBODIMENTS

The following is a detailed description of certain embodiments of the invention presently deemed by the inventors to be the best mode of carrying out the invention.

FIG. 1 illustrates, diagrammatically and on an enlarged scale, a flake 10 of magnetodielectric material formed in accordance with one embodiment of the invention. In the embodiment under discussion, the flake should be of a size less than 1,000 microns, and may suitably range in size from about 100 to about 500 microns or more. The flake may be comprised of either a single layer of magnetic material 12 or, as illustrated, a plurality of alternating layers of magnetic material 12 and insulating material 14. The magnetic materials to be used include many binary, ternary and multicompound materials in addition to the nickel-iron and nickel-iron-cobalt alloys cited in the Walser et al patent. Typical new materials include neodymium, praseodymium, terbium dysprosium, niobium, titanium, zirconium and other rare earth elements that provide either or both of greater magnetization and higher frequency response. Such materials may be used in various compounds with one another and/or iron, cobalt or molybdenum.

The insulating materials preferably include silicon, polymers, and other materials that can be deposited simultaneously with and at the same speed as the magnetic layers.

The thickness of the layers of both the magnetic material and the insulating material is in the range of from about 200 to about 5,000 angstroms (0.02 to 0.50 microns). Preferably, the layers of insulating material are made as thin as feasible in order to enhance the effective volume fraction of magnetic material in the flakes.

The number of layers of material in each flake may range from 1 (a single layer of magnetic material) to 100 or more. The total thickness of each flake may therefore range from about 0.02 microns to about 50 microns or more.

The flakes 10 are manufactured by first forming a large sheet of material 12 or alternating layers of materials 12 and 14 and then breaking the sheet into particles and mechanically sizing the particles into flakes of the desired size. The sheet of magnetodielectric material is suitably formed, as illustrated diagrammatically in FIG. 2, by depositing a layer of material 12 or alternating layers of materials 12 and 14 onto a manufacturing substrate 30 that is coated with a layer 32 of water or solvent soluble release material, e.g., soap. The substrate may be a wide continuous sheet or film of a suitable polymer of the requisite strength, i.e., PET, in sheet or roll form, for purposes of continuous in-line processing. When applied in plural layers of materials 12 and 14, the layer first deposited onto the substrate 30 may be either one of the two materials, as desired, and the layer last deposited may likewise be either one of the two materials, as desired. However, as illustrated, it is preferably that the first and last layers be of insulating material 14 so that the conductive layers 12 are substantially encapsulated in insulation and will therefore eliminate conductive paths and prevent or greatly reduce DC conductivity in the composition when the flakes are dispersed in the binder.

Deposition of the two materials is preferably carried out sequentially in a common vacuum chamber by sputter or vapor deposition, such as suggested by Walser et al or as taught in Meckel et al U.S. Pat. No. 4,322,276, Homstad et al. PCT/US89/01772 (Publication No. WO 89/10430, dated Nov. 2, 1989), Scobey et al. U.S. Pat. No. 4,851,095 and Yang U.S. Pat. No. 5,513,040. More preferably, the insulating material 14 comprises a curable material that can be deposited by spraying or the like and then cured insitu by electron beam (E beam) or ultraviolet (UV) radiation, e.g., a polymer that is deposited in the form of a monomer or dimer and then polymerized insitu by E beam or UV radiation. Apparatus for sputter or vapor deposition of the metal and for deposition and curing of a curable dielectric, in sequence in a common vacuum chamber, are disclosed for example in Yializis et al. U.S. Pat. No. 4,842,893 and Yang U.S. Pat. No. 5,464,710. Such apparatus is readily adapted to practice of the present invention and provides a method for applying the two materials simultaneously in a single, continuous, in-line production operation.

After the deposition steps have been completed, the substrate 30 is immersed in water or in an appropriate solvent to dissolve the release coat 32 and free the sheet of magnetodielectric material from the manufacturing substrate. The manufacturing substrate may then be conditioned for further use.

The sheet of magnetodielectric material floated off the substrate 30 breaks into pieces or chunks which are filtered out of the solvent and dried. The pieces or chunks are then mechanically or ultrasonically reduced to flakes of the desired size by screening the same through sieves of selected sizes. Alternatively, and preferably, sizing is achieved by dispersing the pieces or chunks of material in a high viscosity fluid and subjecting the pieces of material to high shear in a high shear mixer. The duration of mixing will in general determine the flake size. A high shear mixer will produce flakes having some size distribution, but such size distribution is found to be desirable so long as the flakes are of performance size.

For some applications, a degree of presizing of the pieces or particles into which the sheet of magnetodielectric material is broken may be attained by utilizing as the substrate 30 a film of material having a surface configuration like a waffle iron thereby to form a sheet of magnetodielectric material containing preselected lines of fracture.

The magnetodielectric flakes 10 thus formed and sized are then mixed in an appropriate liquid or fluent binder at a concentration of from about 30% to about 60% by volume. The binder should preferably be dielectric, radio frequency transparent and easily set or cured. The composition thus formed may then be sprayed or brushed onto the surface of an article much like paint to impart magnetodielectric characteristics to the article. Alternatively, the composition may be cast or molded into sheets or structural magnetic components or elements. For application as a coating material, i.e., paint, the preferred binder is polyurethane. For other applications, other binders may be more suitable, such as epoxies, phenolics and polimides. For example, cobalt based multi-layer magnetic flakes in epoxy would have a tensile modulus on the order of 10 million psi and a tensile strength of 50,000 psi, which is comparable to aluminum. Colorants may also be added to the composition for aesthetic purposes, if desired.

When used as a coating material or in sheet form, the typical thickness of the coating or sheet will be on the order of 0.005 to 0.5 inches, depending upon the frequency or frequencies of interest.

The invention thus provides a magnetodielectric material that, in comparison to the prior art, is lower in volume, lower in cost, lighter in weight and thinner, and at the same time has high electrical thickness, low reflection, low impedance and low attenuation loss. Because the supporting substrate and essential sheet formation of the prior art is eliminated by practice of the invention, the effective volume concentration of magnetic material in the composition is greatly increased and the number of uses and devices to which the composition is applicable are greatly broadened. The material of the invention is thinner, lighter, lower in cost and can be made into any arbitrary shape desired. The material will thus serve to reduce the size, weight and volume of electrical devices such as antennas, delay lines, phase shifters and other electrical devices requiring interaction with and/or magnetic response to high frequency radiation.

The objects, advantages and features of the invention have therefore been shown to be attained in a convenient, practical, economical and facile manner.

While preferred embodiments of the invention have been illustrated and described, it is to be appreciated that various changes, rearrangements and modifications may be made therein without departing from the scope of the invention as defined by the appended claims.

What is claimed is:

1. A magnetodielectric composition comprising flakes of magnetic material dispersed in a binder,
    said flakes consisting essentially of a thin film of magnetic material or alternating thin films of magnetic material and insulating material,
    said flakes being dispersed in said binder at a concentration from about 30% to about 60% by volume.

2. A composition as set forth in claim 1 wherein said flakes are of a size less than 1,000 microns and a thickness of at least about 0.02 microns.

3. A composition as set forth in claim 1 wherein each layer of material has a thickness of from about 0.02 to about 0.50 microns.

4. A composition as set forth in claim 1 wherein the magnetic material is comprised of neodymium, praseodymium, terbium, dysprosium, niobium, titanium, zirconium, a rare earth element having high magnetization or high frequency response, iron, cobalt, nickel, and compounds and alloys thereof.

5. A composition as set forth in claim 1 wherein the insulating material is comprised of an UV or E beam curable material, a polymer or silicon.

6. A composition as set forth in claim 1 wherein the binder comprises a radio frequency transparent dielectric material.

7. A composition as set forth in claim 1 wherein the binder comprises polyurethane, an epoxy, a phenolic or a polyimide.

8. A composition as set forth in claim 1 wherein the binder is fluent and the composition is applicable as a coating material to articles of manufacture.

9. A composition as set forth in claim 8 wherein the composition is applicable to the articles at a coating thickness of from about 0.005 to about 0.5 inches.

10. A composition as set forth in claim 1 wherein the composition comprises a cast or molded element.

11. A composition as set forth in claim 1 wherein the flakes consist of alternating thin films of magnetic material and insulating material and the films of magnetic material are encapsulated in the films of insulating material, and wherein the binder is dielectric.

12. A process for making compositions having magnetodielectric characteristics and comprised of low volume light weight thin film particles dispersed in a binder comprising the steps of providing a substrate, depositing on a surface of the substrate at least one thin film of magnetic material capable of providing magnetodielectric characteristics, separating the thin film of magnetic material from the substrate, dividing the thin film into performance size particles for use as particulates in magnetodielectric compositions, and dispersing the particles in a binder at a concentration of from about 30% to about 60% by volume.

* * * * *